(12) United States Patent
Gabusi et al.

(10) Patent No.: US 11,815,389 B2
(45) Date of Patent: Nov. 14, 2023

(54) WEIGHING DEVICE WITH LEVERS FOR SECURING A CONTAINER OF WEIGHED SUBSTANCE

(71) Applicant: I.M.A. Industria Macchine Automatiche S.p.A., Ozzano dell'Emilia (IT)

(72) Inventors: Gabriele Gabusi, Ozzano dell'Emilia (IT); Mauro Maccagnani, Ozzano dell'Emilia (IT); Sergio Manera, Ozzano dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 355 days.

(21) Appl. No.: 17/284,174

(22) PCT Filed: Aug. 30, 2019

(86) PCT No.: PCT/IT2019/050194
§ 371 (c)(1),
(2) Date: Apr. 9, 2021

(87) PCT Pub. No.: WO2020/075204
PCT Pub. Date: Apr. 16, 2020

(65) Prior Publication Data
US 2021/0333144 A1  Oct. 28, 2021

(30) Foreign Application Priority Data
Oct. 10, 2018  (IT) .................. 102018000009300

(51) Int. Cl.
*G01G 17/04*  (2006.01)
*G01G 21/22*  (2006.01)
(Continued)

(52) U.S. Cl.
CPC ............... *G01G 17/04* (2013.01); *B01L 9/06* (2013.01); *G01G 21/22* (2013.01); *F16B 2/04* (2013.01); *F16B 2/06* (2013.01); *F16B 2/185* (2013.01)

(58) Field of Classification Search
CPC .......... G01G 17/04; G01G 21/22; B01L 9/06; F16B 2/00; F16B 2/205; F16B 2/18;
(Continued)

(56) References Cited

U.S. PATENT DOCUMENTS 3,361,343 A * 1/1968 Lerner .................. B04B 5/0421
494/20
4,057,148 A * 11/1977 Meyer ...................... B01L 9/06
211/74
(Continued)

FOREIGN PATENT DOCUMENTS

JP  2010063754 A  3/2010
WO  2007/061987 A2  5/2007
(Continued)

OTHER PUBLICATIONS

Int'l Search Report and Written Opinion dated Mar. 17, 2020 in Int'l Application No. PCT/IT2019/050194.

*Primary Examiner* — Randy W Gibson
(74) *Attorney, Agent, or Firm* — Panitch Schwarze Belisario & Nadel LLP

(57) ABSTRACT

A weighing device to weigh at least one container suitable to contain one or more substances, including weighing means and a body connected to the weighing means and in which a compartment is defined, configured to temporarily house the container and provided with an aperture defining a passage gap for the introduction of the container inside the compartment along an axis of introduction, in which the
(Continued)

body also includes a plurality of holding levers to hold the container inside the compartment.

8 Claims, 3 Drawing Sheets

(51) Int. Cl.
   *B01L 9/06* (2006.01)
   *F16B 2/04* (2006.01)
   *F16B 2/18* (2006.01)
   *F16B 2/00* (2006.01)
   *F16B 2/06* (2006.01)

(58) Field of Classification Search
   CPC .... F16B 2/185; F16B 2/06; F16B 2/04; F16B 2/02; F16B 2/10
   See application file for complete search history.

(56) References Cited

U.S. PATENT DOCUMENTS

| | | | | |
|---|---|---|---|---|
| 5,137,693 | A  * | 8/1992 | Mawhirt | B01L 9/06 |
| | | | | 422/562 |
| 5,579,928 | A  * | 12/1996 | Anukwuem | B01L 9/06 |
| | | | | 422/561 |
| 8,178,799 | B2 * | 5/2012 | Luchinger | G01G 17/04 |
| | | | | 177/180 |
| 11,518,596 | B2 * | 12/2022 | Komann | B65D 25/103 |
| 2015/0108034 | A1 * | 4/2015 | Deutschle | B01L 9/06 |
| | | | | 206/593 |

FOREIGN PATENT DOCUMENTS

| | | |
|---|---|---|
| WO | 2014/072019 A2 | 5/2014 |
| WO | 2018/019985 A1 | 2/2018 |

* cited by examiner

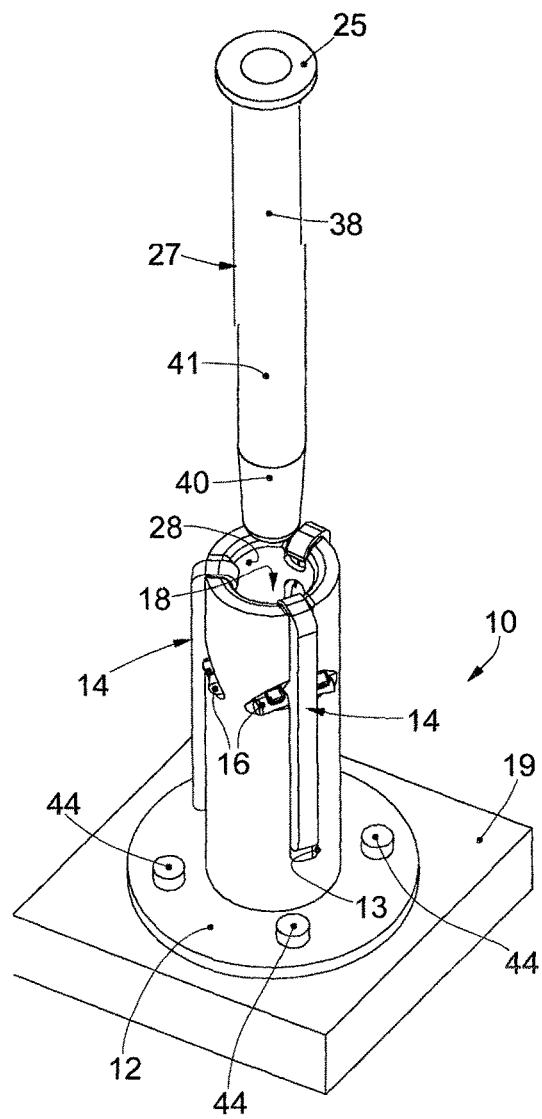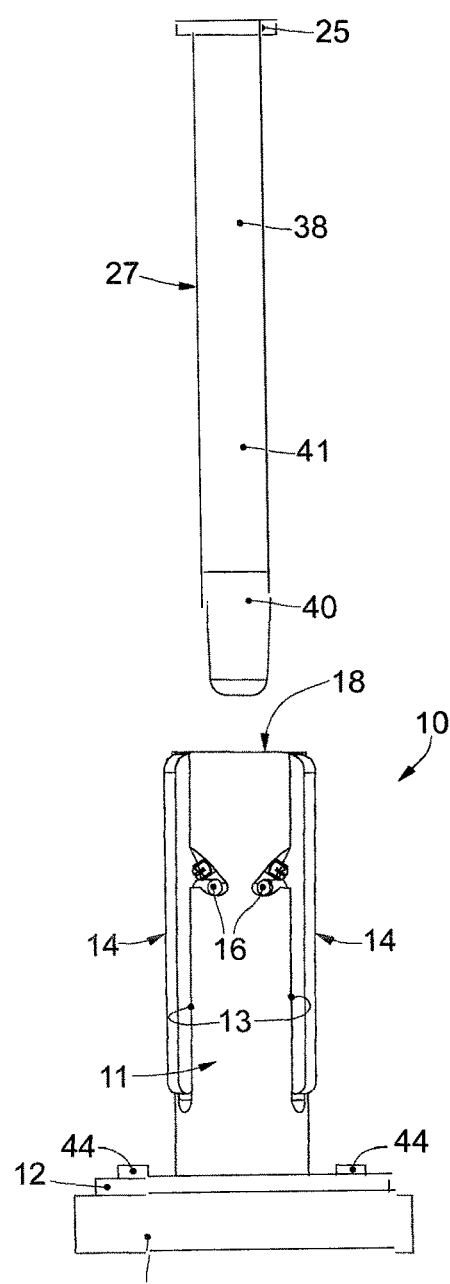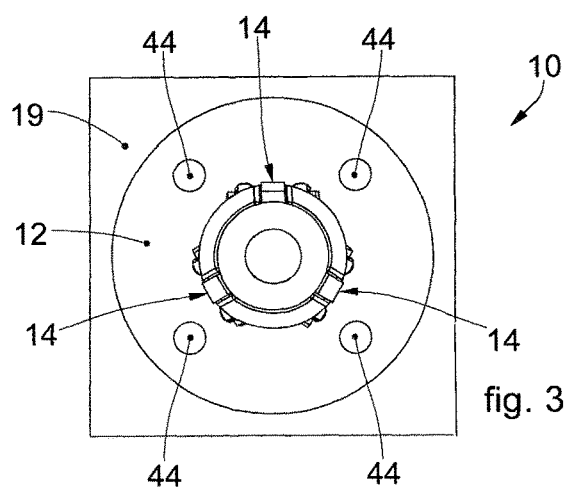

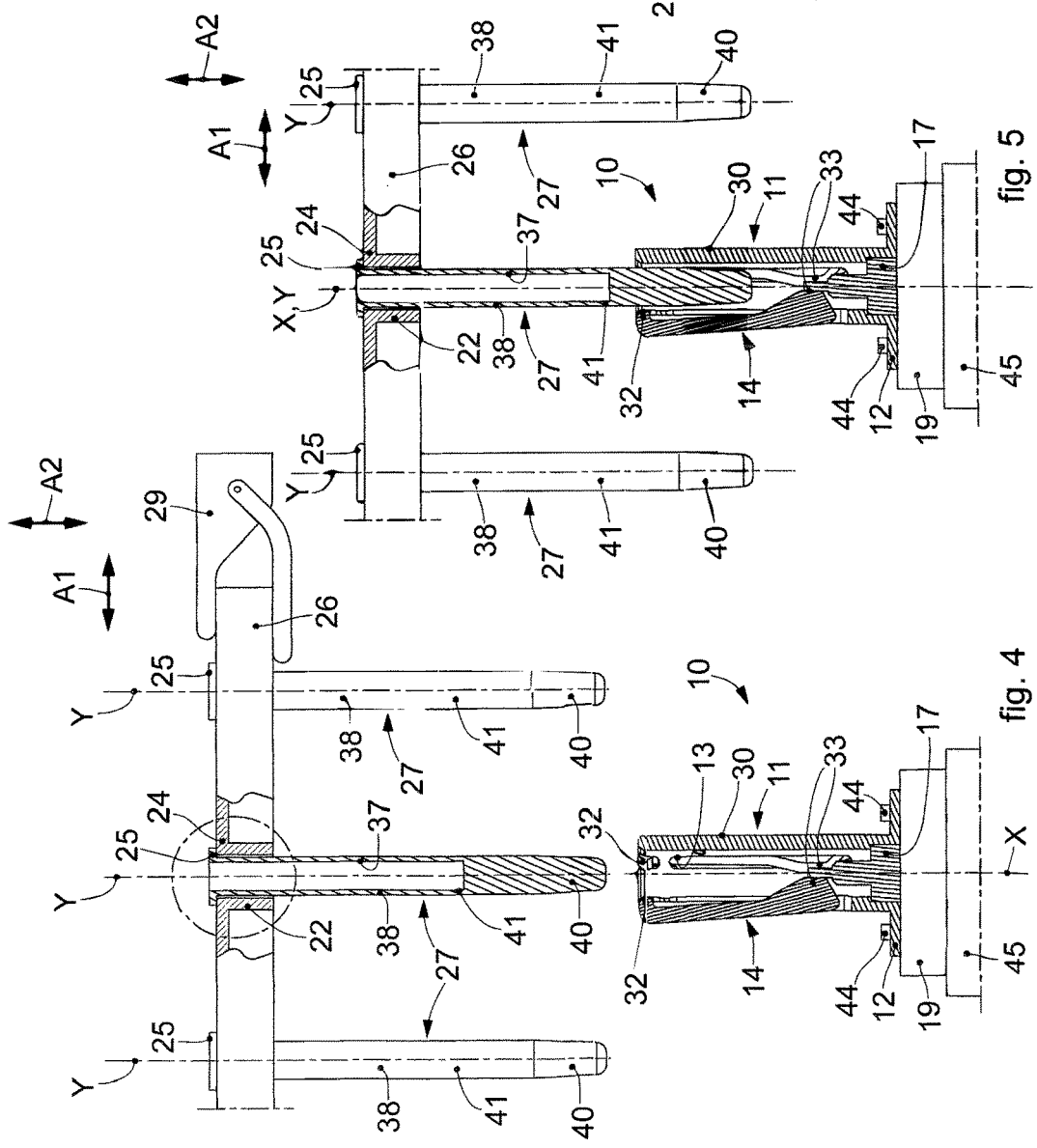

WEIGHING DEVICE WITH LEVERS FOR SECURING A CONTAINER OF WEIGHED SUBSTANCE

CROSS-REFERENCE TO RELATED APPLICATIONS

This application is a Section 371 of International Application No. PCT/IT2019/050194, filed Aug. 30, 2019, which was published in the English language on Apr. 16, 2020, under International Publication No. WO 2020/075204 A1, which claims priority under 35 U.S.C. § 119(b) to Italian Application No. 102018000009300, filed Oct. 10, 2018, the disclosures of each of which are incorporated herein by reference.

FIELD OF THE INVENTION

The present invention concerns a weighing device suitable to weigh one or more containers, in particular both when the containers are empty and also when they are filled with a product or substance.

With the term product or substance we mean any liquid, semi-solid, gelatin or solid composition, which in the latter case can be in powder or in grains and can be of vegetable and/or animal and/or chemical origin.

The containers to be weighed can be temporarily housed in a rack, or in similar and/or comparable means, in preset positions and subsequently stabilized and weighed individually or in groups.

By way of a non-limiting example, the weighing device to weigh containers, in accordance with the present invention, can be used in the pharmaceutical, cosmetic, health or chemical field.

BACKGROUND OF THE INVENTION

It is known that in the pharmaceutical, health, chemical, industrial or more generally technical-scientific fields there is often the need to fill containers with a precise quantity of a determinate product.

In particular, in the chemical, pharmaceutical and health sector there is often the need to fill containers such as flasks, test tubes, vials, bottles, syringes, capsules and suchlike, with products according to a predefined dosage which, due to the nature of the product introduced and the function that product is intended to perform, only allows for small variations contained within predefined limits.

Typically, the containers are positioned in suitable seatings of a rack ("nest") from which they can be removed for the filling and/or weighing operations, performed respectively in filling systems and weighing systems, the latter possibly being able to be integrated into the first.

The operations of filling and/or weighing the containers can also be performed without removing the containers from the rack. In this case, the rack is handled with movement means that allow to position the rack, and in particular the container to be filled and/or weighed, in correspondence with a filling nozzle and/or a weighing device.

The filling of the containers occurs in filling systems by means of filling machines provided with filling nozzles which, in relation to the type of product treated, are suitable to deliver a precise quantity of product into the container.

It is fundamental, after or at the same time as the filling, to verify the weight of the product introduced into each container, since the objective is to introduce a quantity of product corresponding to the expected dosage.

For this purpose, the use of weighing systems is known, associated or not with the filling systems as above, which use weight detectors, or load cells, suitable to detect the weight of the containers both when they are empty (tare), and also when they are filled (gross weight).

Weighing systems of this type are described, for example, in document WO2018/019985, in the name of the Applicant.

Document WO2018/019985 describes a weighing system for containers positioned in suitable housing seatings disposed in a rack, movable by means of a manipulator arm toward a load cell.

The positioning of the single container (both before and also after its filling, for the detection of the tare and gross weight) on the load cell occurs without the container moving from the rack and from the housing seating.

The weighing system also comprises a weighing device, comprising a load cell, and suitable to house, at least for the time required for the weighing operation, the single container or part thereof. The weighing devices described in document WO2018/019985 are provided with a suitably shaped seating to house at least part of the container involved in the weighing operation.

Considering the large number of weighing operations to be performed, that is, at least two weighings for each container (tare and gross weight), the weighing operation has to necessarily be fast and precise at the same time.

However, due to the rapid movement of the rack toward the weighing device, or possibly vice versa, the container is difficult to stabilize and center in the device. This is both because the positioning of the container in the weighing device involves adjustment vibrations and also because, necessarily, the seating of the device has to have a larger size than that of the container, the size of the container intended as the characterizing one with respect to the direction of insertion. These vibrations, if they are not promptly eliminated, can cause an incorrect weight measurement, that is, considerable weighing times to wait for until, after a period of inertia during which the vibrations are damped, it is possible to carry out a correct weighing.

Furthermore, these weighing devices do not guarantee the centering of the container in the device, nor its vertical disposition inside the seating during the weighing step. The container, in fact, can partially rest on the housing seating of the rack or it can partially rest on the walls of the seating of the weighing device, discharging part of its own weight and causing an incorrect measurement.

In addition, if the filling step and the weighing step occur in the same system, it is essential that the container is perfectly vertical both to prevent the filling nozzles of the product to be introduced from damaging the containers during their movement, and also to avoid wetting the walls of the container above the level of the final dose, a disadvantage that would cause the walls of the container itself to be non-compliant. Because of this, for example if the container is a syringe, the walls of the container would remain wet in the area directly in contact with the cap, if the container is a bottle to be lyophilized, the walls of the container would remain "dirty" after the lyophilization operation.

Furthermore, possible impacts of the filling nozzles against the containers could cause vibrations which distort the weight control.

There is therefore the need to perfect a weighing device to weigh containers that can overcome at least one of the disadvantages of the state of the art.

One purpose of the present invention is to provide a weighing device to weigh containers able to speed up the weighing operation, obtaining at the same time accurate and precise measurements.

Another purpose of the present invention is to provide a weighing device to weigh containers able to stabilize and center a container and maintain it in a vertical position at least during the weighing step and possibly during the filling step.

Another purpose of the present invention is to provide a weighing device to weigh containers able to stabilize and center containers characterized by very different shapes.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

Embodiments described here concern a weighing device to weigh containers such as flasks, test tubes, vials, bottles, syringes, capsules and suchlike, used in the pharmaceutical, health, chemical, industrial or more generally technical-scientific fields.

The weighing device, in accordance with the present invention, is configured to weigh at least one container, suitable to contain one or more substances.

The weighing device comprises weighing means and a body, connected to the weighing means, defining a compartment to temporarily house the container and provided with an aperture defining a passage gap for the introduction of the container inside the compartment along an axis of introduction.

The body further comprises a plurality of holding levers disposed symmetrically around the axis of introduction, each holding lever being provided with a proximal holding end, disposed in correspondence with the aperture, and a distal actuation portion, disposed inside the compartment downstream of the proximal holding end along the axis of introduction. Each holding lever is mobile, in rotation, away from and toward the axis of introduction between an inactive position and a holding position in which the proximal holding end and the distal actuation portion respectively have alternately two inverse positions radially distanced from and near to the axis of introduction and vice versa.

In a preferred embodiment, the movement of the holding levers between the inactive position and the holding position can be activated by the insertion and the removal of the container respectively in and from the compartment.

Embodiments described here also concern a weighing method which uses the weighing device, in accordance with the present invention, to weigh a container containing one or more substances. The method provides to:

introduce the container into a compartment of a body of the weighing device through an aperture, defining a passage gap for the introduction of the container inside the compartment along an axis of introduction;

weigh the container by means of weighing means connected to the body.

The method also provides to:

hold and center the container in the compartment by means of a plurality of holding levers disposed symmetrically around the axis of introduction, each of the holding levers being provided with a proximal holding end disposed in correspondence with the aperture and with a distal actuation portion disposed inside the compartment downstream of the proximal holding end along the axis of introduction. Each of the holding levers rotates away from and toward the axis of introduction between an inactive position and a holding position in which the proximal holding end and the distal actuation portion respectively have alternately two inverse positions radially distanced from and near to the axis of introduction and vice versa One advantage of the weighing device according to the present invention is that it is inexpensive and not bulky.

Another advantage of the weighing device according to the present invention is that it can be easily used in combination with the racks, or "nests", commonly used in the chemical-pharmaceutical field to support the containers during the different treatment steps thereof. For example, the weighing device according to the present invention can be integrated into matrices, which have in particular the same size (in terms of ranks and columns) as the rack or are equal to a subset of the latter.

Another advantage of the weighing device according to the present invention is that it is simple to build.

A further advantage of the weighing device according to the present invention, and of the corresponding weighing method, is that it allows measurements of the weight of the substance or of the products contained inside the containers that are precise, reliable and fast.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

ILLUSTRATION OF THE DRAWINGS

These and other characteristics of the present invention will become apparent from the following description of some embodiments, given as a non-restrictive example with reference to the attached drawings wherein:

FIG. 1 is a three-dimensional view of a weighing device according to the present invention, in which a container to be weighed is also visible;

FIG. 2 is a side elevation view of the weighing device of FIG. 1;

FIG. 3 is a plan view from above of the weighing device of FIG. 1;

FIGS. 4-6 show an operative sequence of a possible weighing method which uses the device of FIG. 1;

FIG. 4a is an enlarged detail of FIG. 4;

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF EMBODIMENTS

Figure 8:
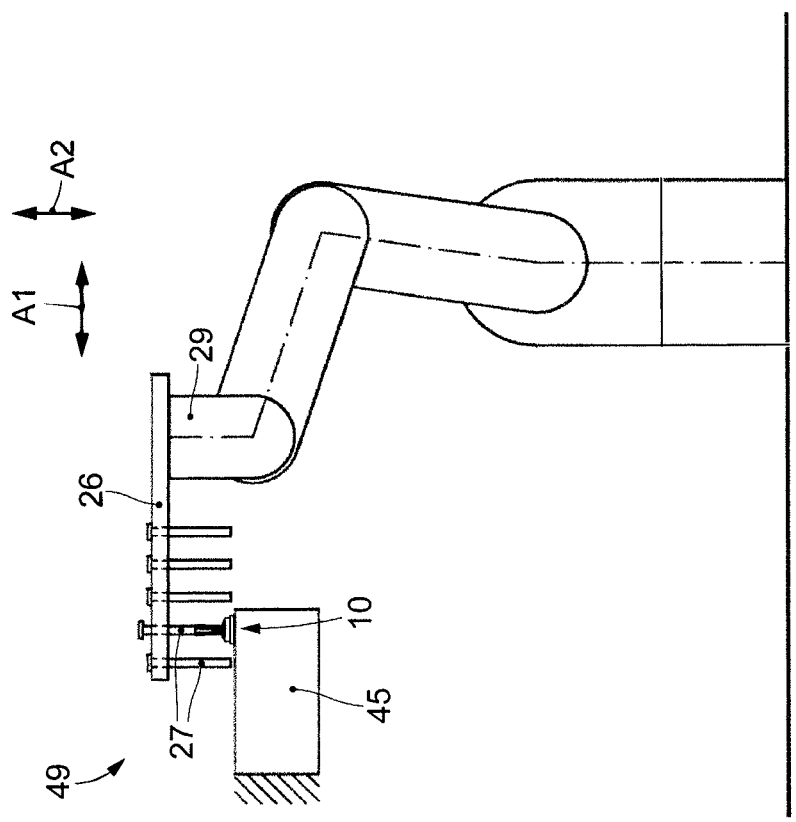
FIGS. 7-8 show a possible weighing system which comprises the weighing device of FIG. 1.

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing the embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Embodiments described using the attached drawings concern a weighing device to weigh containers, indicated as a whole with reference number 10 in the attached drawings.

In accordance with some embodiments, the device 10 is configured to weigh at least one container 27, suitable to contain one or more substances.

The container 27 is optionally located in a support element, or rack, 26 (FIGS. 4-6) which is suitably handled to interact with a weighing system 49 (FIGS. 7-8), as will be explained in greater detail below.

The device 10 comprises weighing means 19 and a body 11 connected to the weighing means 19 and defining a compartment 28, configured to at least temporarily house the container 27, and provided with an aperture 18 defining a passage gap for the introduction of the container 27 inside the compartment 28 along an axis of introduction X.

With the term containers, here and in the following description, we mean containers such as flasks, test tubes, vials, bottles, cartridges, syringes, capsules and suchlike used in the pharmaceutical, chemical or industrial field to contain substances in a precise and determinate quantity.

In the attached drawings, the container 27 is configured as a vial, with reduced capacity and elongated shape, however it is evident that the weighing device 10, and the corresponding weighing method, are suitable to weigh any different type of container whatsoever, such as for example those listed above.

In accordance with one aspect of the present invention, the body 11 further comprises a plurality of holding levers 14 disposed symmetrically around the axis of introduction X. Each of the holding levers 14 is provided with a proximal holding end 32 disposed in correspondence with the aperture 18 and with a distal actuation portion 33 disposed inside the compartment 28 downstream of the proximal holding end 32 along the axis of introduction X. Each holding lever 14 is mobile, in rotation, away from and toward the axis of introduction X between an inactive position and a holding position in which the proximal holding end 32 and the distal actuation portion 33, respectively, have alternately two inverse positions radially distanced from and near to the axis of introduction X and vice versa.

The centering and holding of the container 27 by means of the holding levers 14, allows to immediately eliminate the inertial behavior of the container 27 caused by the movement to insert it into the compartment 28 thus obtaining a more precise and faster weighing, since the vibrations which affect the container 27 immediately cease.

In addition, the centering of the container 27 in the device 10 avoids, during the filling step, possible collisions of filling nozzles with walls of the container 27 so as to prevent both possible damage and also possible contamination.

In accordance with possible embodiments, the device 10 is suitable to house, at least for the time required for a weighing operation, at least one container 27.

The container 27 can be located in a rack 26 or in similar and/or comparable structures, in a predetermined and substantially stable position.

The rack 26 has a plurality of seatings 21 (FIG. 4*a*), distanced from each other and typically disposed in a matrix, provided with walls 22 between which the container 27 is positioned.

In the following description of the container 27 we will refer, by way of a non-limiting example, to the type shown for example in FIGS. 1-2. As can be easily seen, however, the embodiments described here can also concern containers 27 with different sizes, shapes and characteristics.

The container 27 has a longitudinal extension along an axis Y which, when the container 27 is disposed inside the seating 21, coincides substantially with the axis of the seating 21, as shown in FIG. 4.

The container 27 is provided with a lateral wall 38 internally delimiting a chamber 37 suitable to contain one or more substances.

Advantageously, the chamber 37, open toward the upper part to allow it to be filled, is delimited, at least laterally, by the lateral wall 38 made of transparent material, for example glass, in order to allow its contents to be visible.

The container 27 is provided with a support edge 25, also called a collar, shaped to rest on a support plane 24 of the rack 26, so that the container 27 is suspended vertically from the rack 26. It should be noted that the axis Y of longitudinal extension of the container 27 is substantially orthogonal to the support plane 24, the axis Y being substantially vertical and the support plane 24 substantially horizontal.

Preferably, the container 27 has a transverse size, that is, the external diameter of the lateral wall 38, which is correlated to the size of the seating 21. In particular, in order to be received in the seating 21, it is evident that the lateral wall 38 has to have a diameter smaller than that of the seating 21, but close to the sizes of the latter in order to prevent the container 27 from oscillating during the movement of the rack 26.

Moreover, as will be better explained below, it is advisable that during the movement of the rack 26, but above all during the weighing of the container 27, the lateral wall 38 is not in contact with the walls 22 of the seating 21, because if this happened the weight measurement could be incorrect.

Thanks to this disposition, with a vertical movement of the rack 26, the container 27 can be easily released, at least partially, from the seating 21 to be inserted into the compartment 28 of the device 10. In particular, the device 10 is made with a bulk and shape such that it does not to interfere with the containers 27 adjacent to the one affected by the weighing operation and not to exceed the weight limits that can be measured by the weighing means 19.

The container 27 can comprise a coupling end 40, positioned below the chamber 37, on the opposite side with respect to the support edge 25.

In particular, in the holding position the holding levers 14 are configured to hold the container 27 in correspondence with a holding zone 41 defined in the lateral wall 38 of the container 27.

In fact, advantageously, the lateral wall 38 is the only part of the container 27 that allows a safe and stable support for the holding levers 14, since the support edge 25 and the coupling end 40 can be subject to deformations. For example, in syringes the area adjacent to that of the cap could be deformed and inclined so as not to be able to offer a stable support to the holding levers 14.

In accordance with some embodiments, the body 11 of the device 10 has a longitudinal development along the axis of introduction X, parallel and substantially coinciding with the axis Y at least when the container 27 is disposed inside the compartment 28.

The compartment 28 has a shape correlated to that of the container 27 to be housed, but a larger size in plan, so as to allow an easy insertion thereof. This, together with the fact that the holding of the container 27 occurs by means of the holding levers 14, allows the device 10 to house containers 27 characterized by very different shapes.

In particular, the compartment 28 is configured to house at least the coupling end 40 and the holding zone 41 of the lateral wall 38.

The compartment 28 can house, as we said, at least the proximal holding end 32 and the distal actuation portion 33 of the holding levers 14.

In accordance with some embodiments, the body 11 is provided with grooves 13 which have a longitudinal extension parallel to the axis X and which are through, able to put the compartment 28 in communication with the outside. The grooves 13 are made on a lateral surface 30 of the body 11 and are configured to receive the holding levers 14.

In particular, the proximal holding ends 32 are received in a zone of the grooves 13 which is disposed in proximity to the mouth of the compartment 28, while the distal actuation portions 33 are received in portions of the grooves 13 disposed in proximity to the bottom of the compartment 28.

The holding levers 14 have a symmetrical and evenly-spaced disposition on the body 11, around the axis of introduction X, so that between one holding lever 14 and the next there is an angle of about 120°.

However, if a device 10 is provided which is able to stabilize and center containers 27 of different sizes with respect to the usual containers 27 used in the pharmaceutical, chemical and industrial fields, the holding levers 14 can be in numbers other than three and be disposed so that between one holding lever 14 and the next there is an angle different from 120°, although possible non-symmetrical dispositions of the holding levers 14 are not excluded.

The holding levers 14 are pivoted to the body 11 by means of pins 16, which are constrained to the lateral surface 30. The proximal holding ends 32 and the distal actuation portions 33 are disposed on the opposite side with respect to the pins 16 so that the latter define axes of pivoting, or fulcrums, with respect to which the corresponding holding levers 14 oscillate to alternately assume the holding position or the inactive position.

In possible implementations, it can be provided to knurl or to rubberize at least the surfaces of the proximal holding ends 32 to facilitate the holding on the container 27.

The device 10 also comprises an abutment element 17, which projects from the bottom of the compartment 28 toward its mouth so as to allow to support part of the distal actuation portions 33 of the holding levers 14, limiting the rotation of the latter.

In possible solutions, it can be provided to not use the abutment element 17, and to avoid an excessive rotation of the holding levers 14 by means of the direct contact between parts of the distal actuation portions 33.

In accordance with some embodiments, the passage from the inactive position to the holding position is caused by a variation in position of each distal actuation portion 33 as a consequence of a rotation of the respective holding lever 14 determined by an interference of each distal actuation portion 33 with a container 27, introduced into the compartment 28 along the axis of introduction X.

The holding levers 14 have a shape and a mass distribution such that:
  in the inactive position (FIG. 4), each proximal holding end 32 is external with respect to the aperture 18 so as to allow the passage of the container 27 along the axis of introduction X, and each distal actuation portion 33 is at a first distance from the axis of introduction X;
  in the holding position (FIG. 6), each respective proximal holding end 32 protrudes inside the aperture 18, in a manner symmetrical with respect to the axis of introduction X, holding and centering the container 27 with respect to the axis of introduction X, and each distal actuation portion 33 is at a second distance from the axis of introduction X, greater than the first distance.

When the holding levers 14 move from the inactive position to the holding position, they rotate due to effect of the weight of the container 27 which, when introduced into the compartment 28, is suitable to thrust with the coupling end 40 onto the distal actuation portions 33 of the holding levers 14, until the proximal holding ends 32 of the holding levers 14 contact the container 27 holding it laterally in order to stabilize it and center it with respect to the axis of introduction X in the compartment 28. In this case, the distal actuation portions 33 move to the second distance from the axis of introduction X.

When the holding levers 14 move from the holding position to the inactive position, the container 27 exiting from the compartment 28 relieves of its weight the holding levers 14 which are rotatable, due to the effect of their shape and mass distribution, until the distal actuation portions 33 move to the first distance from the axis of introduction X, for example resting on the abutment element 17, and the container 27 has completely exited from the compartment 28.

The profile of the holding levers 14 and their mass distribution are such that:
  in the inactive position, the resultant of the forces on the center of mass of the holding lever 14 produces a rotation of the holding lever 14 such as to move the proximal holding end 32 away from the axis of introduction X and bring the distal actuation portion 33 to the second distance from the axis of introduction X;
  in the holding position, the resultant of the forces on the center of mass of the holding lever 14 produces a rotation of the holding lever 14, in the opposite direction with respect to the rotation in the inactive position, such as to bring the proximal holding end 32 closer to the axis of introduction X and bring the distal actuation portion 33 to the first distance from the axis of introduction X.

In accordance with some embodiments, the device 10 can comprise a support base 12 to which the weighing means 19 are anchored. The base 12 can be made in a single body with the body 11 or it can be connected to the body 11 subsequently.

The base 12 can have holes for the passage of screws 44 to attach to the weighing means 19. However, other types of mechanical attachment are not excluded, for example with a snap-in or pressure mechanism, or chemical, for example with the aid of a glue.

The device 10 can be associated with a weighing system 49 or with a filling system (not shown) or with both.

Figure 7:
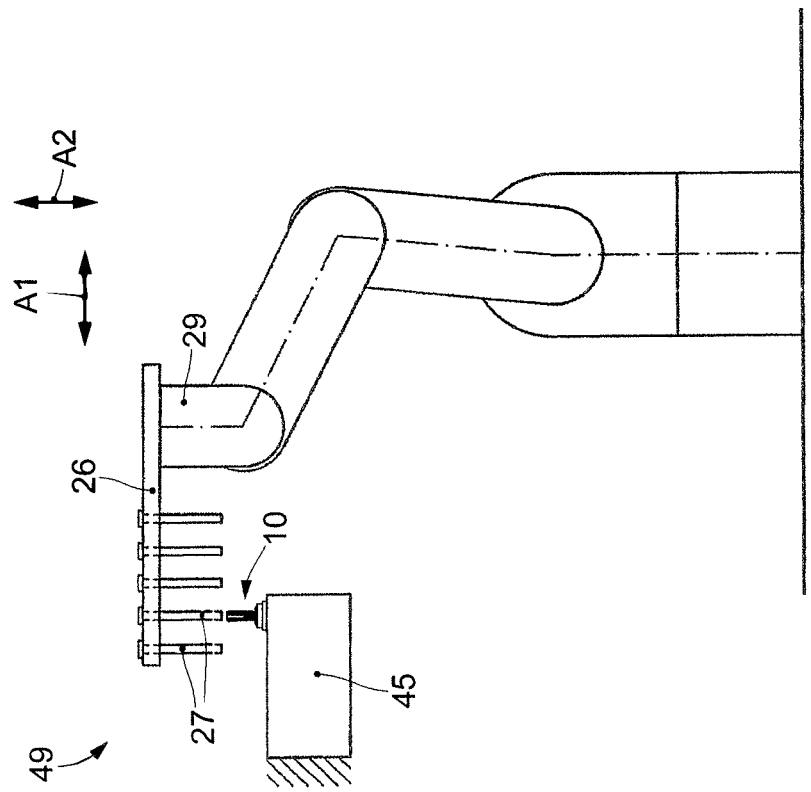

In possible embodiments, shown in FIGS. 7-8, a weighing system 49, in this embodiment not associated with a filling station, is configured to weigh containers 27 positioned in the rack 26.

The weighing system 49 comprises a fixed support body 45, with which at least one weighing device 10 is associated, suitable to weigh the substances or products present in the containers 27.

The rack 26 can be handled with respect to three axes (A1, A2—in the drawing only two axes are indicated, the third axis is perpendicular to the drawing) by movement means 29, in order to position on each occasion the container 27 to be weighed in correspondence with the device 10.

The movement means 29 can be robots, also anthropomorphic, or mobile positioning tables, for example according to a program, on two or three axes.

In some possible solutions, the support body 45 can also move on three axes, with respective movement means not shown, to produce a movement combined with that of the rack 26, in order to position, on each occasion, the device 10 in correspondence with the container 27 to be weighed.

In possible solutions, the weighing system 49 can be configured to weigh more than one container 27 at a time. In this case, a plurality of devices 10 can be present on the support body 45 to perform a simultaneous weighing for example of one or more rows, or ranks of containers 27.

It is also clear that, although the present invention has been described with reference to some specific examples, a person of skill in the art shall certainly be able to achieve many other equivalent forms of weighing device to weigh containers, having the characteristics as set forth in the claims and hence all coming within the field of protection defined thereby.

The invention claimed is:

1. A weighing device to weigh at least one container, said container being provided with a lateral wall internally delimiting a chamber suitable to filled with one or more substances through an upward opening and said weighing device comprising a weighing device and a body connected to said weighing device and defining a compartment configured to temporarily house said container and provided with an aperture defining a passage for the introduction of said container inside said compartment along an axis of introduction, wherein said body also comprises a plurality of holding levers disposed symmetrically around said axis of introduction, each of said holding levers being provided with a proximal holding end disposed in correspondence with said aperture and with a distal actuation portion disposed inside said compartment distanced from said proximal holding end along said axis of introduction, each of said holding levers being mobile, in rotation, between an inactive position in which said proximal holding end is moved away from said container placed into said compartment, and a holding position in which said proximal holding end engages said container at a holding zone defined in the lateral wall of said container placed into said compartment, and wherein in said active position the container held by said plurality of holding levers has the upward opening free to be filled.

2. The device as in claim 1, wherein the passage between said inactive position and said holding position is caused by a variation in position of each distal actuation portion as a consequence of a rotation of the respective holding lever determined by an interference of each distal actuation portion with a container introduced into said compartment along said axis of introduction.

3. The device as in claim 1, wherein in said inactive position each proximal holding end is external with respect to said aperture so as to allow the passage of said container along said axis of introduction and each distal actuation portion is at a first distance from said axis of introduction, while in said holding position each respective proximal holding end protrudes inside said aperture, symmetrically with respect to said axis of introduction, in order to hold and center said container with respect to said axis of introduction, and each distal actuation portion is at a second distance from said axis of introduction, bigger than said first distance.

4. The device as in claim 1, wherein said body comprises through grooves intended to receive said holding levers.

5. The device as in claim 1, wherein said holding levers have a symmetrical and evenly-spaced disposition on the body, around said axis of introduction, so that between one holding lever and the next there is an angle of about 120°.

6. The device as in claim 1, wherein said holding levers are pivoted to said body by means of pins, wherein said proximal holding ends and said distal actuation portions are disposed on the opposite side with respect to said pins so that the latter define axes of pivoting, or fulcrums, with respect to which the corresponding holding levers oscillate to alternately assume said holding position or said inactive position.

7. A weighing method to weigh at least one container provided with a lateral wall internally delimiting a chamber suitable to filled with one or more substances through an upward opening and suitable to contain one or more substances, said method providing to:
   introduce said container into a compartment of a body of said weighing device through an aperture defining a passage gap for the introduction of said container inside said compartment along an axis of introduction,
   weigh said container by means of a weighing device means connected to said body,
   said method being wherein it also provides to hold and center said container in said compartment by means of a plurality of holding levers disposed symmetrically around said axis of introduction, each of said holding levers being provided with a proximal holding end disposed in correspondence with said aperture and with a distal actuation portion disposed inside said compartment distanced from said proximal holding end along said axis of introduction, each of said holding levers rotating between an inactive position in which said holding end is moved away from said container placed into said compartment and a holding position in which said proximal holding end engages said container at a holding zone defined in the lateral wall of said container placed into said compartment, and wherein in said active position the container held by said plurality of holding levers has the upward opening free to be filled.

8. The method as in claim 7, wherein when said holding levers move from said inactive position to said holding position, they rotate due to effect of the weight of said container which, when it is introduced into said compartment, is suitable to thrust with a coupling end on said distal actuation portions of said holding levers, until said proximal holding ends of said holding levers contact said container, holding it laterally in order to stabilize it and center it, with respect to said axis of introduction, in said compartment.

* * * * *